(12) United States Patent
Krebs et al.

(10) Patent No.: US 9,976,596 B2
(45) Date of Patent: May 22, 2018

(54) RING FOR A BEARING, AN INNER RING, AN OUTER RING, AND A BEARING

(71) Applicant: AKTIEBOLAGET SKF, Göteborg (SE)

(72) Inventors: Philipp Krebs, Nieuwegein (NL); Sebastian Ziegler, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/106,454

(22) PCT Filed: Dec. 18, 2014

(86) PCT No.: PCT/EP2014/078358
§ 371 (c)(1),
(2) Date: Jun. 20, 2016

(87) PCT Pub. No.: WO2015/091724
PCT Pub. Date: Jun. 25, 2015

(65) Prior Publication Data
US 2017/0002866 A1    Jan. 5, 2017

(30) Foreign Application Priority Data

Dec. 18, 2013    (GB) .................................. 1322422.5

(51) Int. Cl.
*F16C 33/64*    (2006.01)
*F16C 19/36*    (2006.01)
(Continued)

(52) U.S. Cl.
CPC .............. *F16C 33/64* (2013.01); *B33Y 10/00* (2014.12); *B33Y 80/00* (2014.12); *F16C 19/364* (2013.01); *F16C 33/60* (2013.01)

(58) Field of Classification Search
CPC ...... F16C 33/58; F16C 33/583; F16C 33/586; F16C 33/588; F16C 33/60; F16C 33/605; F16C 33/62; F16C 33/64; F16C 19/364
See application file for complete search history.

(56) References Cited

U.S. PATENT DOCUMENTS 2,370,173 A    2/1945    Kendall
2,376,779 A    5/1945    Kendall
(Continued)

FOREIGN PATENT DOCUMENTS

DE    2745527 A1        4/1978
DE    102008013285 A1   9/2009
DE    102010034962 A1   2/2012

*Primary Examiner* — James Pilkington
(74) *Attorney, Agent, or Firm* — Bryan Peckjian; SKF USA Inc. Patent Dept.

(57) ABSTRACT

The invention provides a ring for a bearing. The invention further provides an inner ring, an outer ring and the bearing. The ring includes a raceway ring being a hardened steel metal ring providing a raceway surface configured and constructed for guiding rolling elements of the bearing. The ring further provides printed material bonded to the steel of the raceway ring. The printed material being material printed via an additive manufacturing process. The printed material may be used to customize a shape of the ring, for example, of the inner ring or the outer ring of the bearing, thus allowing flexible customization.

12 Claims, 6 Drawing Sheets

(51) Int. Cl.
*F16C 33/60* (2006.01)
*B33Y 10/00* (2015.01)
*B33Y 80/00* (2015.01)

(56) References Cited

U.S. PATENT DOCUMENTS

| | | | | |
|---|---|---|---|---|
| 5,208,981 A | * | 5/1993 | Puzsik | B29C 33/123 |
| | | | | 264/263 |
| 5,531,522 A | * | 7/1996 | Ide | F01D 25/164 |
| | | | | 384/202 |
| 5,716,147 A | * | 2/1998 | Cook | F16C 33/62 |
| | | | | 384/484 |
| 2013/0216174 A1 | | 8/2013 | Braun | |

* cited by examiner

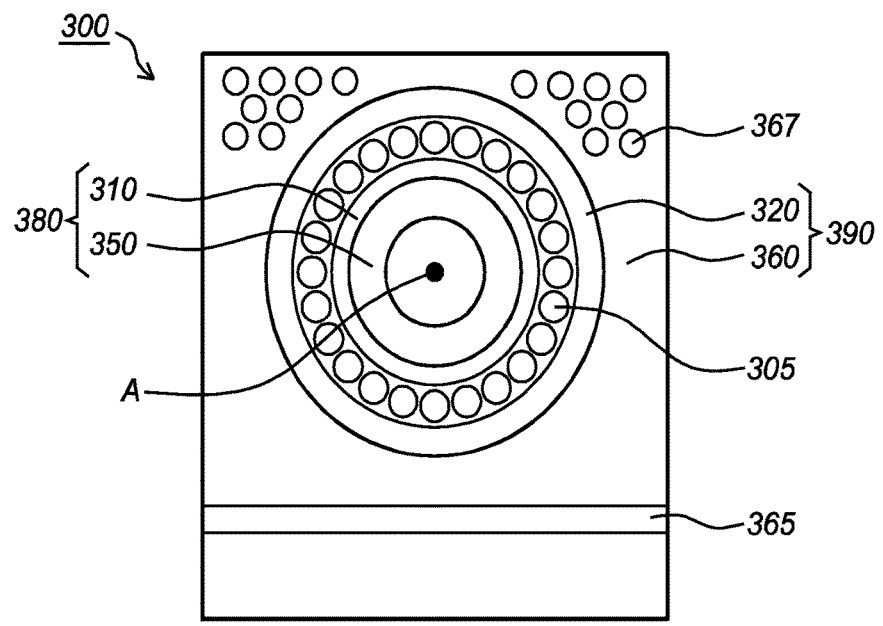
Fig. 3A
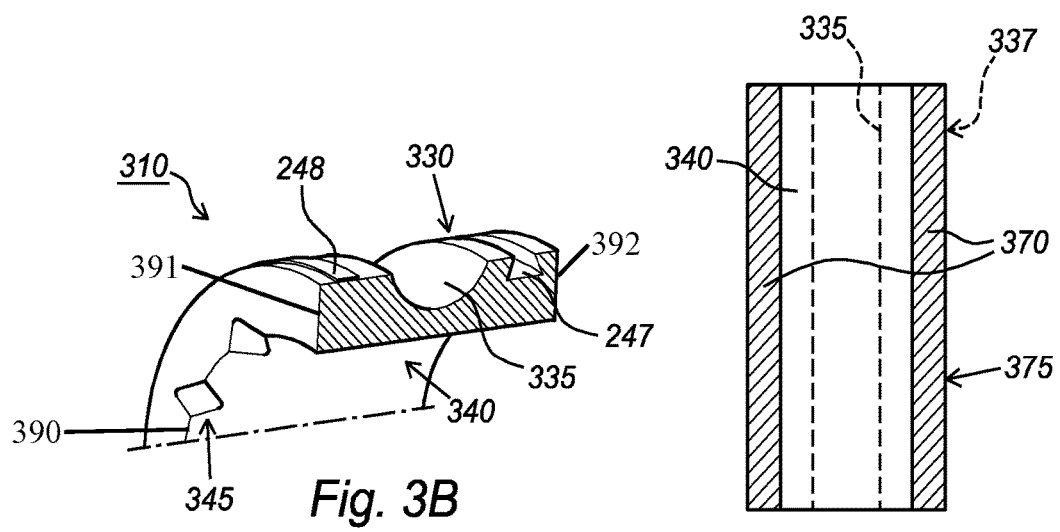
Fig. 3B
Fig. 3C

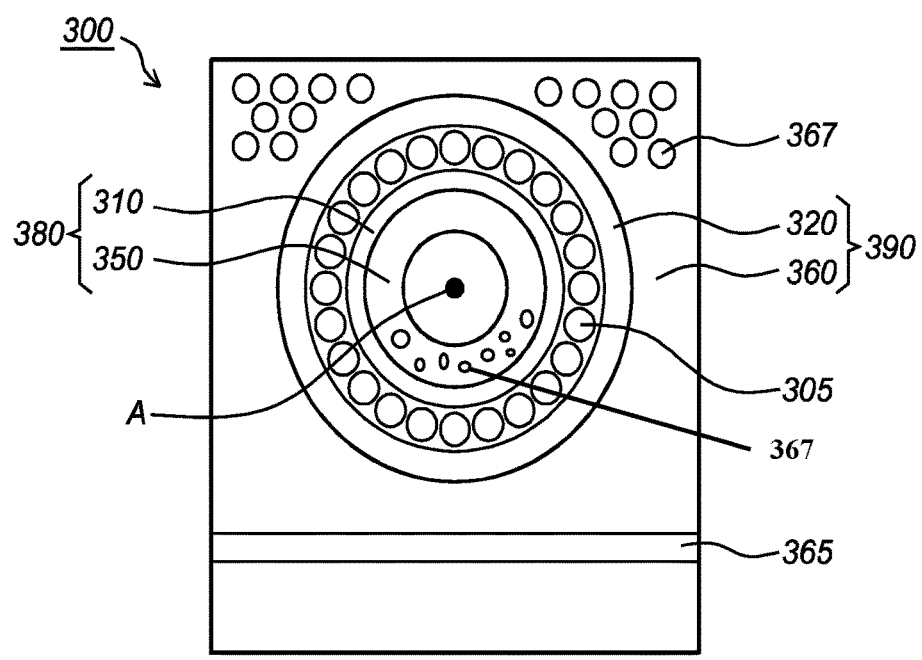
*Fig. 3*D

RING FOR A BEARING, AN INNER RING, AN OUTER RING, AND A BEARING

CROSS-REFERENCE TO RELATED APPLICATIONS

This application is the U.S. national stage of International Application No. PCT/EP2014/078358 filed on Dec. 18, 2014, which claims priority to Great Britain patent application no. 1322422.5 filed on Dec. 18, 2013, the contents of which are both fully incorporated herein by reference.

FIELD OF THE INVENTION

The invention relates to a ring for a bearing. The invention further relates to an inner ring, an outer ring and a bearing.

BACKGROUND ART

Additive manufacturing or more commonly called 3D printing is a known production technique in which a three-dimensional solid object is generated from a digital model. The process of additive manufacturing starts with generating the digital model via any known digital modeling methods, such as using a CAD program. Next, the digital model is divided into slices in which each slice indicates for this layer of the digital model where the printed material should be located. The individual slices are sequentially fed into an additive manufacturing tool or 3D printer which deposits the material according to the individual slices and as such generates the complete three-dimensional solid object layer by layer.

In the early days of additive manufacturing, mainly plastic materials or resins have been used as printed material for generating the three-dimensional solid object, but other processes have been developed in which also other materials, including different types of metal may be deposited in layers using this additive manufacturing technique. A major benefit of this manufacturing technique is that it allows the designer to produce virtually any three-dimensional object in a relatively simple production method. This may be especially beneficial when, for example, an initial model is required of a product or when only a limited number of products are required. A drawback of this manufacturing technique is the speed at which the three-dimensional solid objection is produced.

The use of additive manufacturing in high-quality bearings has been limited. This is caused by material requirements for such high-quality bearings which seem insufficient for the current materials applied via the additive manufacturing process.

SUMMARY OF THE INVENTION

One of the objects of the invention is to provide a ring for a bearing in which the ring comprises printed material printed via additive manufacturing.

Embodiments are defined in the dependent claims.

The ring in accordance with the first aspect of the invention comprises a raceway ring being a hardened steel metal ring comprising a raceway surface configured and constructed for supporting and guiding rolling elements of the bearing, the ring further comprises printed material bonded to the steel of the raceway ring, the printed material being material printed via an additive manufacturing process.

The inventors have realized that a main requirement of the material when used in a bearing is to withstand wear and rolling contact fatigue due to the contact forces on the rolling elements of the bearing in use. To be able to withstand this wear and rolling contact fatigue, the raceway surface is typically produced from hardened steel. The current additive manufacturing processes cannot produce hardened metal material in line with the requirements of a rolling element bearing. So the inventors have realized that the use of a raceway ring manufactured according to the first aspect of the invention enables to have the relatively high wear and rolling contact fatigue requirements imposed on the raceway surface, while allowing printed material to be attached to the raceway ring for generating the required shape of the inner ring or outer ring for a bearing and to carry the structural loads on the bearing and transmit them to the bearing housing or the shaft. As such the shape of the inner ring and/or outer ring of the bearing may be generated using additive manufacturing and allowing all degrees of freedom to produce any shape of the inner ring or outer ring which is possible using additive manufacturing, while using the raceway ring comprising the raceway surface to ensure that the raceway surface is able to withstand the wear and rolling contact fatigue of the rolling elements.

Next to the wear and strength requirements of the raceway surface, the inventors have realized that there is another reason why the raceway surface is preferably not produced using additive manufacturing. A solid object produced via the additive manufacturing process typically has a granulate structure. This is caused by the printing process in which individual layers of resin or molten plastic or in which individual granulated solid particles are deposited in a layer by layer process. Having a raceway surface constituted of a granular structure would generate additional vibrations in the bearing in use, when the rolling elements roll over the granular structured surface. These additional vibrations usually cannot be tolerated and may cause additional wear and noise when using such a bearing. When using the raceway ring as part of the ring of the bearing according to the current invention, the raceway ring comprises the raceway surface. This raceway surface is constituted of smooth hardened steel which would prevent the additional vibrations in the bearing. The ring is further constituted by attaching printed material to the raceway ring such that the ring for the bearing comprises a required shape and possibly also stiffness.

In an embodiment of the ring the raceway ring comprises an attachment element for improving the bonding between printed material and the raceway ring. The bonding between the printed material and the raceway ring is important because the printed material typically is used to connect the bearing to a bore or shaft. To strengthen this bonding, the raceway ring comprises attachment elements, which may be surface roughened structures or even coatings on the raceway ring.

In an embodiment of the ring, the raceway surface comprises a contact area being an area where the rolling elements, in use, contact the raceway surface, wherein the attachment element is only present outside the contact area. The attachment elements typically are elements to roughen the surface of the raceway ring at which the printed material is to be applied, for example, during a separate manufacturing step. Still, the contact area of the raceway surface should be smooth such that the rolling elements may smoothly roll over the contact area of the raceway surface of the bearing in use, reducing the overall wear, vibrations and noise produced by the bearing. As such, it is beneficial when the attachment elements are not produced at the contact area of the raceway ring. Furthermore, the attachment elements may reduce the strength of the raceway ring which should be avoided at the contact area of the raceway surface. Finally, any residual stress that may be in the raceway ring may be concentrated around the attachment elements, which again should be avoided at the contact area.

In an embodiment of the ring, the raceway surface comprises a non-stressed area in circumferential direction between the contact area and an edge of the raceway ring, the raceway surface comprising the attachment element only at the non-stressed area. Although there seems to be always some subsurface stress in the raceway ring, also at the non-stressed area, however, when the subsurface stress is below a certain threshold, the area around the raceway surface typically is called "non-stressed area". As indicated already above the presence of the attachment elements may reduce the strength of the overall inner ring or outer ring of the bearing. Only applying the attachment elements at the non-stressed area further ensures that the reduction of the overall strength is limited. The stress at the non-stressed area is preferably less than 25% of the surface stress resulting from the most loaded rolling element of the bearing in use. This level of 25% may, for example, be used for a rolling element and raceway surface with a crowning and/or logarithmic profile. In such an embodiment, the attachment elements preferably are located outside an additional width of the raceway surface which is about 2 times the half width of the contact ellipse of the contact of the most loaded rolling element with the raceway ring. Beyond this distance, the stress should have decreased to below 25% of the surface stress.

In an embodiment of the ring, the printed material is bonded to the steel of the raceway ring only outside the contact area.

In an embodiment of the ring, the attachment element comprises a circumferential groove in circumferential direction, and/or a radial groove in radial direction and/or an axial groove in axial direction, and/or an array of indentations of the raceway ring. Such grooves roughen the surface of the raceway ring to improve the bonding between the printed material and the raceway ring. The attachment element may further comprise a roughened part of a surface of the raceway ring roughened via chemical surface treatment and/or mechanical surface treatment and/or etching surface treatment. The attachment element may further comprise a coating applied to at least a part of the raceway ring.

In an embodiment of the ring, the raceway ring further comprises a flange constructed and configured for, in use, at least partially supporting the rolling elements of the bearing in a direction parallel to a rotation axis of the rolling element. This flange is part of the raceway ring and so is made of hardened steel. This may be produced using a hard turning process for shaping the raceway ring to include such flange. A benefit when having the flange produced as part of the raceway ring is that the flange may withstand heavier loads compared to an embodiment in which such flange would be constituted of printed material.

In an embodiment of the ring, the printed material comprises structural material for carrying a load for strengthening the raceway ring. This allows the bearing to carry larger radial and axial loads and increases the robustness of the bearing application. In a further embodiment of the ring, the printed material comprises a press-fit element for fitting the ring to a shaft or to a bore. Using printed material for generating the press-fit element allows using a relatively standard bearing which may be adapted to fit a specific customized element. In a further embodiment of the ring, the printed material comprises a further flange constructed and configured for, in use, at least partially supporting the rolling elements of the bearing in a direction parallel to a rotational axis of the ring. While a printed flange will be less strong than a flange that is part of the raceway, a printed flange is more flexible in design and requires much less material to be removed by machining when producing the raceway ring, since the needed thickness of the raw material becomes less. In a further embodiment of the ring, the printed material comprises a support structure for supporting the ring. This allows realizing arbitrary shapes of the support structure which are not possible with classical machining and thereby optimize parameters, such as weight and/or stiffness. In a further embodiment of the ring, the printed material as a non-circular construction. Often the inner ring or outer ring of a bearing are produced using turning processes which typically result in rotation symmetric structures and constructions. Using the additive manufacturing process, any shape may be produced, including non-circular constructions.

In an embodiment of the ring, the printed material comprises a plurality of cavities. Such cavities may, for example, be hollow and may be used to reduce the overall weight of the ring, and thus also of the bearing. In addition, the cavities may have a predefined shape or may comprise an internal network of structures to ensure that the overall strength of the printed material is hardly compromised due to the cavities. Bearings may be very large, for example, in industrial wind turbines. The weight of these bearings has a significant impact on the overall structure requirements of the industrial wind turbine. Also replacement of such bearing at the industrial windmill poses a challenge. Reducing the overall weight of the bearing by using printed material having cavities would reduce many of these challenges. A further significant benefit can be achieved in applications related to aviation and aerospace—as weight for such applications is almost always critical.

In an embodiment of the ring, a dimension of the raceway ring in a direction perpendicular to the rotational axis is more than 15% of a width of the contact area. The contact area is the area of the raceway that is in contact with the rolling element. Strain and stress caused by the rolling elements rolling over the contact area of the raceway surface reduces as a function of the distance from the contact area—also in a dimension perpendicular to the rotational axis of the ring into the hardened steel material of the raceway ring. As such, the dimension of the raceway ring in the direction perpendicular to the rotational axis should be at least 4 times the half width of the contact ellipse between the rolling element and the raceway surface to ensure that the strain forces and stress forces substantially remain inside the hardened steel material of the raceway ring.

In an embodiment of the ring, the printed material comprises a metal having a granular structure. The printed material may, for example, be chosen from a list comprising steel, stainless steel, maraging steel, tool steel, low alloy steel, copper alloys, nickel alloys, cobalt alloys, aluminum, aluminum alloys, titanium, titanium alloys.

In an embodiment of the ring, the ring constitutes an inner ring of the bearing, the raceway surface facing away from the rotational axis.

In an embodiment of the ring, the ring constitutes an outer ring of the bearing, the raceway surface facing towards the rotational axis.

The bearing in accordance with the second aspect of the invention comprises the ring according to the invention.

BRIEF DESCRIPTION OF THE DRAWINGS

These and other aspects of the invention are apparent from and will be elucidated with reference to the embodiments described hereinafter. In the drawings, FIG. 3A shows a cross-sectional view of a further bearing comprising printed material, FIG. 3B shows a cross-sectional view of a raceway ring for a ball-bearing having different types of attachment elements, FIG. 3C shows a part of a raceway ring indicating the non-stressed area of the raceway ring, and FIG. 3D illustrates a part of a raceway ring illustrating cavities in printed material of the inner ring.

DETAILED DESCRIPTION OF EMBODIMENTS

Figure 1A:
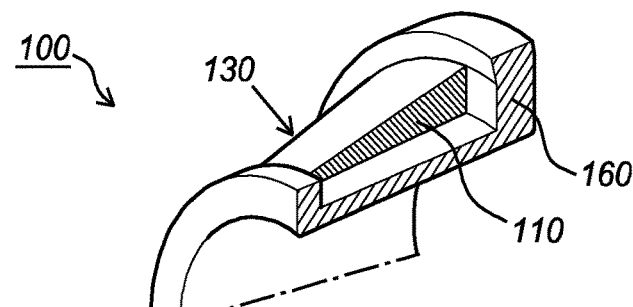
FIG. 1A shows a cross-sectional view of a ring for a bearing according to the invention.

FIG. 1A shows a cross-sectional view of a ring 100 for a bearing 200, 300 according to the invention. The ring 100 shown in FIG. 1A is an inner ring 280 (see FIG. 2) for a bearing, for example, for the bearing shown in FIG. 2. The ring 100 comprises a raceway ring 110 having a raceway surface 130, and comprises printed material printed to the raceway ring 110. The use of printed material 160 provides a very flexible way of producing a ring for a bearing in which the printed material 160 may have any shape required. Using a substantially standardized raceway ring 110 as a starting product for producing the customized ring 100 by adding the printed material 160 ensures both high flexibility and high quality. In use, the rolling elements 205 (see FIG. 2) of a bearing may impose a significant stress and wear onto the contact surface 335 (see FIGS. 3B and 3C) of the ring 100. Due to this strain and wear, the contact surface 335 is preferably produced of hardened steel. Generating the ring 100 by a combination of the raceway ring 110 and the printed material 160 ensures that the contact surface 335 at the raceway surface 130 can withstand the strain and wear imposed by the rolling elements 205 while allowing the high flexibility by using the printed material 160.

Figure 1B:
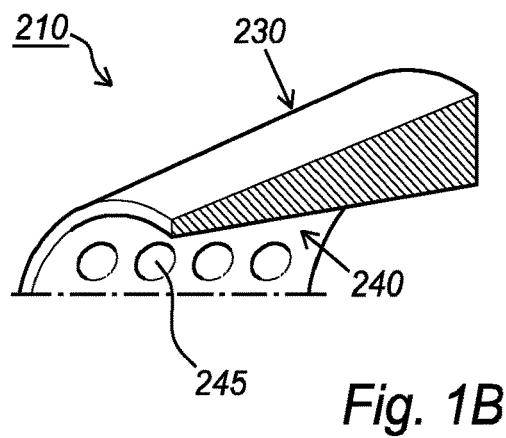
FIG. 1B shows a cross-sectional view of a raceway ring according to the invention.

FIG. 1B shows a cross-sectional view of a raceway ring 210 comprising attachment elements 245. The attachment elements 245 may, for example, be an array of indentations 245 as shown in FIG. 1B. Alternatively, the attachment elements 245 may be one or more circumferential grooves 247 see FIG. 3B), and/or one or more radial grooves (not shown) and/or one or more axial grooves (not shown). Even further alternatively, the attachment elements 245 may be mechanically or chemically applied surface roughening elements (not shown) or even a coating 248 (see FIG. 3B). The attachment elements 245 may, for example, be applied to the opposite surface 240 being a surface of the raceway ring 210 arranged on the opposite side of the raceway surface 230.

Figure 2:
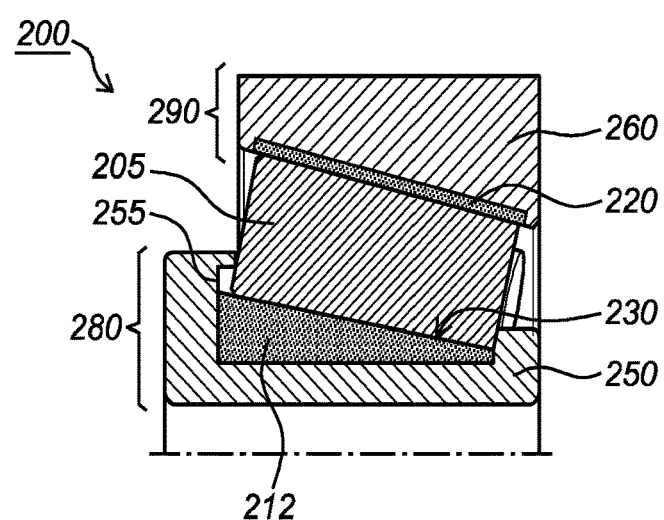
FIG. 2 shows a cross-sectional view of a bearing comprising printed material.

FIG. 2 shows a cross-sectional view of a bearing 200 comprising printed material 250, 255, 260. The bearing 200 comprises rolling elements 205 in the shape of rollers 205 being substantially cylindrical rolling elements 205 arranged between the inner ring 280 and the outer ring 290. Both the inner ring 280 and the outer ring 290 constitute a ring according to the invention and comprise of a combination of a raceway ring 212, 220 and printed material 250, 260.

The outer ring 290 comprises a relatively flat raceway ring 220 together with the printed material 290 which defines the outer shape of the bearing 200. This printed material 290 may, for example, be formed to fit a specific bore (not shown) or may have a shape with which the bearing 200 may be fixed to a specific structure (not shown). Due to the combination of the raceway ring 220 and the printed material 290, the outer ring 290 may guide the rolling elements 205 smoothly without too much wear, while allowing the outer dimensions of the bearing 200 to be shaped according to the specific requirements of this specific bearing 200. Thus allowing a high quality raceway surface 230 (see FIG. 1B) while allowing maximum flexibility regarding outer dimensions. At the interface between the raceway ring 220 and the printed material 260 attachment elements (not shown in FIG. 2) are applied.

In the current embodiment, the inner ring 280 also comprises a raceway ring 212 which has a slanted surface 230 (also indicated as tapered surface also FIG. 1B) as raceway surface 230 with respect to the rotational axis A to withstand axial forces applied to the bearing 200. Such a slanted or tapered surface 230 may be generated during the mechanical processing the raceway ring 212. When the raceway ring 212 is constituted of hardened material, this mechanical processing may be done using a hard turning process. A benefit of using such hard turning process is that the dimensions of the resulting raceway ring 212 may be better controlled compared to using a non-hardened material for shaping the raceway ring 212 which subsequently requires hardening to produce the hardened raceway surface 230. Such hardening process may change the outer dimensions of the raceway surface 230. The inner ring 280 as shown in FIG. 2 again comprises printed material 255, 250 for defining an inner dimension of the bearing 200, for example, to ensure that the bearing 200 fits around a specific shaft (not shown). Again, the combination of this raceway ring 212 together with the printed material 250 allows to use a relatively standardized raceway ring 212 while customize the inner shape and dimension of the bearing 200.

The inner ring 280 as shown in FIG. 2 comprises the printed material 255 which is the printed flange 255 which is constructed and configured for, in use, at least partially supporting the rolling elements 205 of the bearing 200 in a direction parallel to the rotational axis A. In such an embodiment, the printed flange 255 may have a similar hatching structure as the remainder of the printed material 250. In an alternative embodiment, the flange 255 may be produced via the machining process of the ring-shaped part 110 such that it forms an integral part of the raceway ring 212. In such an embodiment, the flange 255 should have a similar structure and color as the raceway ring 212. Forces which the flange 255 may be able to withstand may be much larger when the flange 255 is produced via the machining process compared to the embodiment in which the flange 255 is constituted of printed material 255. However, when the strength of the printed material 255 is sufficient, the use of printed material 255 as the flange 255 would enhance the flexibility of the production of the bearing 200.

FIG. 3A shows a cross-sectional view of a further bearing 300 comprising printed material 350, 360. The bearing 300 shown in FIG. 3A is a ball-bearing 300 comprising rolling elements 305 being spheres 305. The inner ring 380 comprises the raceway ring 310 having printed material 350 bonded to the raceway ring 310, for example, using attachment elements (not shown). The outer ring 390 comprises the raceway ring 320 having printed material 360 bonded to the raceway ring 320, for example, using attachment elements (again, not shown). As can be seen from FIG. 3A, the outer dimensions of the printed material 360 attached to the raceway ring 320 of the outer ring 390 may have any shape, for example, having the rectangular cross-sectional dimension as shown in FIG. 3A. In such a configuration as shown in FIG. 3A, the printed material 360 of the outer ring 390 may further comprise a bore 365, for example, for allowing screws or other attachment means to connect the outer ring 390 to a structural element (not shown). In the embodiment shown in FIG. 3A the printed material 360 of the outer ring 390 further comprises cavities 367 which may be used to reduce the overall weight of the bearing 300.

FIG. 3B shows a cross-sectional view of the raceway ring 310 for the ball-bearing 300 shown in FIG. 3A. The cross-sectional view of this raceway ring 310 shows different types of attachment elements 247, 248, 345 which may be used to bond the printed material 360 (see FIG. 3A) to the raceway ring 310. One of the attachment elements 247 shown is a circumferential groove 247 which may be applied, for example, outside the contact area 335 of the raceway surface 330. Another attachment element 248 shown is a coating 248, again applied outside the contact area 335 of the raceway surface 330. The cross-sectional view of FIG. 3B shows further attachment element 345 being indentations 345 applied to the opposite surface 340 (also referred to as a rear surface in the claims) of the raceway surface 330 of the raceway ring 310. The raceway surface 330 is connected to the rear surface 340 by via first and second radially extending axial surfaces 391, 392. Referring to FIG. 3D, the printed material 350 of the inner ring 310 may include cavities 367.

FIG. 3C shows a part of a raceway ring 310 indicating the non-stressed area 337, 370 of the raceway ring 310. The raceway ring 310 is viewed from the rotation axis A outward. The dashed lines in FIG. 3C indicate the contact area 335 and the non-stressed area 337 is arranged on the raceway surface 330 between the contact area 335 and the edge 375 of the raceway ring 310. Also at the opposite surface 340 of the raceway ring 310 a non-stressed area 370 is present which may have a slightly different dimension compared to the non-stressed area 337 at the raceway surface 330, again between the contact area 335 and the edge 375 of the raceway ring 310.

Figure 4A:
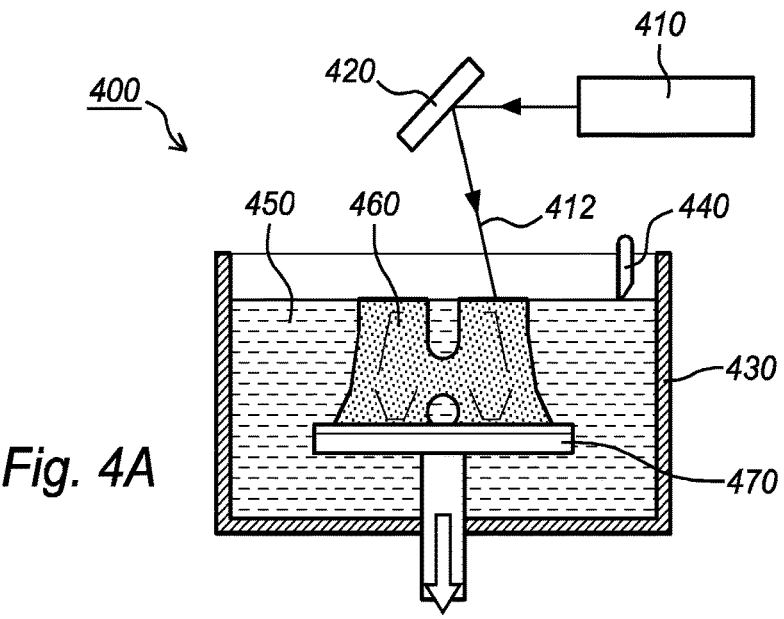
FIG. 4A shows a first embodiment of an additive manufacturing tool in which a liquid resin is used for applying the printed material in the additive manufacturing process.

FIG. 4A shows a first embodiment of an additive manufacturing tool 400 in which a liquid resin 450 is used for applying the printed material 460 in the additive manufacturing process. Such additive manufacturing tool 400 comprises resin container 430 comprising the liquid resin 450. Inside the resin container 430 a platform 470 is positioned which is configured to slowly move down into the resin container 430. The additive manufacturing tool 400 further comprises a laser 410 which emits a laser beam 412 having a wavelength for curing the liquid resin 450 at the locations on the printed material 460 where additional printed material 460 should be added. A re-coating bar 440 is drawn over the printed material 460 before a new layer of printed material 460 is to be applied to ensure that a thin layer of liquid resin 450 is on top of the printed material 460. Emitting using the laser 410 those parts of the thin layer of liquid resin 450 where the additional printed material 460 should be applied will locally cure the resin 450. In the embodiment as shown in FIG. 4A the laser beam 412 is reflected across the layer of liquid resin 450 using a scanning mirror 420. When in the current layer all parts that need to be cured, have been illuminated with the laser beam 412, the platform 470 lowers the printed material 460 further into the liquid resin 450 to allow the re-coating bar 460 to apply another layer of liquid resin 450 on top of the printed material 460 to continue the additive manufacturing process.

Figure 4B:
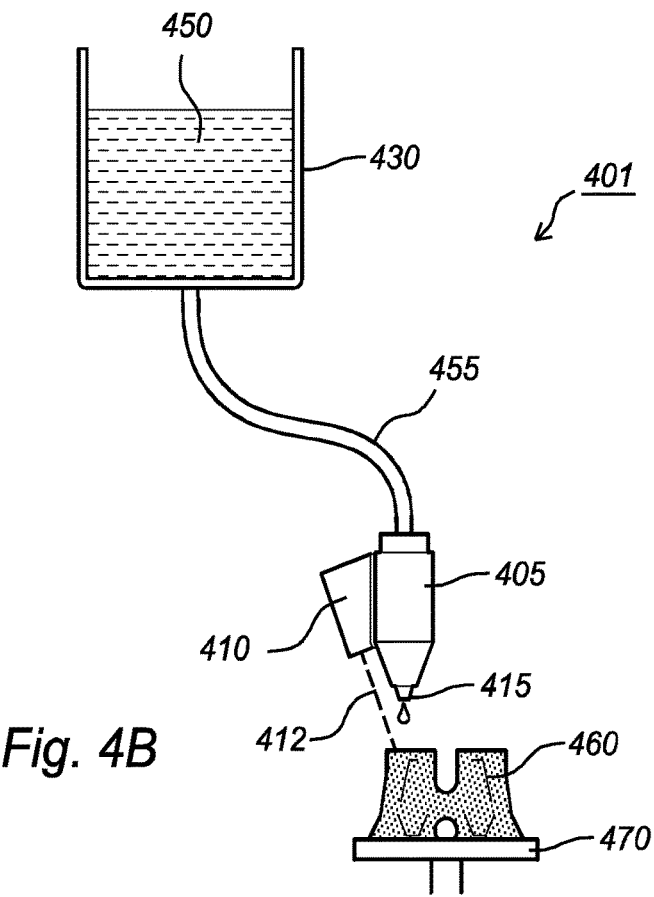
FIG. 4B shows a second embodiment of the additive manufacturing tool in which a liquid resin is dispensed from a dispenser for applying the printed material in the additive manufacturing process.

FIG. 4B shows a second embodiment of the additive manufacturing tool 401 in which a liquid resin 450 is dispensed from a dispenser 405 or print head 405 for applying the printed material 460 in the additive manufacturing process. The additive manufacturing tool 401 again comprises the resin container 430 comprising the liquid resin 450 which is fed via a feed 455 towards the print head 405. The print head 405 further comprises a print nozzle 415 from which droplets of liquid resin 450 are emitted towards the printed material 460. These droplets may fall under gravity from the print head 405 to the printed material 460 or may be ejected from the print nozzle 415 using some ejection mechanism (not shown) towards the printed material 460. The print head 405 further comprises a laser 410 emitting a laser beam 412 for immediately cure the droplet of liquid resin 450 when it hits the printed material 460 to fix the droplet of liquid resin 450 to the already printed material 460. The printed material 460 forming a solid object may be located on a platform 470.

Figure 5A:
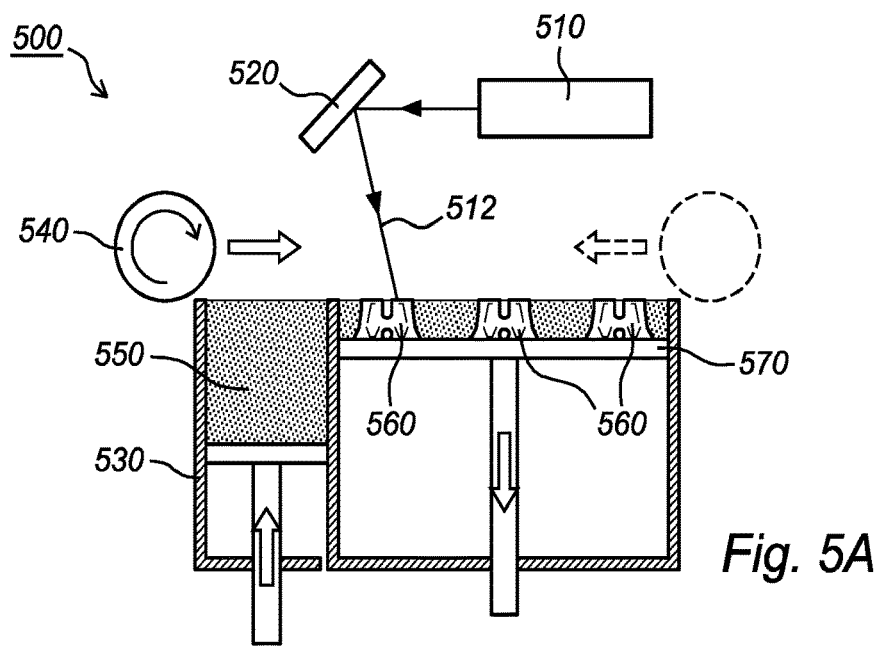
FIG. 5A shows a third embodiment of the additive manufacturing tool in which the material is granulated into small solid particles which are used for applying the printed material in the additive manufacturing process.

FIG. 5A shows a third embodiment of the additive manufacturing tool 500 in which the material is granulated into small solid particles 550 which are used for applying the printed material 560 in the additive manufacturing process. Now, the additive manufacturing tool 500, also known as a Selective Laser Sintering tool 500, or SLS tool 500 comprises a granulate container 530 comprising the granulated small solid particles 550. The printed material 560 is located again on a platform 570 and is completely surrounded by the granulated small solid particles 550. Lowering the platform allows a granulate feed roller 540 to apply another layer of granulated solid particles 550 on the printed material 560. Subsequently locally applying the laser beam 512 using the laser 510 and the scanning mirror 520 will locally melt the granulated solid particles 550 and connects them with each other and with the printed material 560 to generate the next layer of the solid object to be created. Next, the platform 570 moves down further to allow a next layer of granulated solid particles 550 to be applied via the granulate feed roller 540 to continue the next layer in the additive manufacturing process.

Figure 5B:
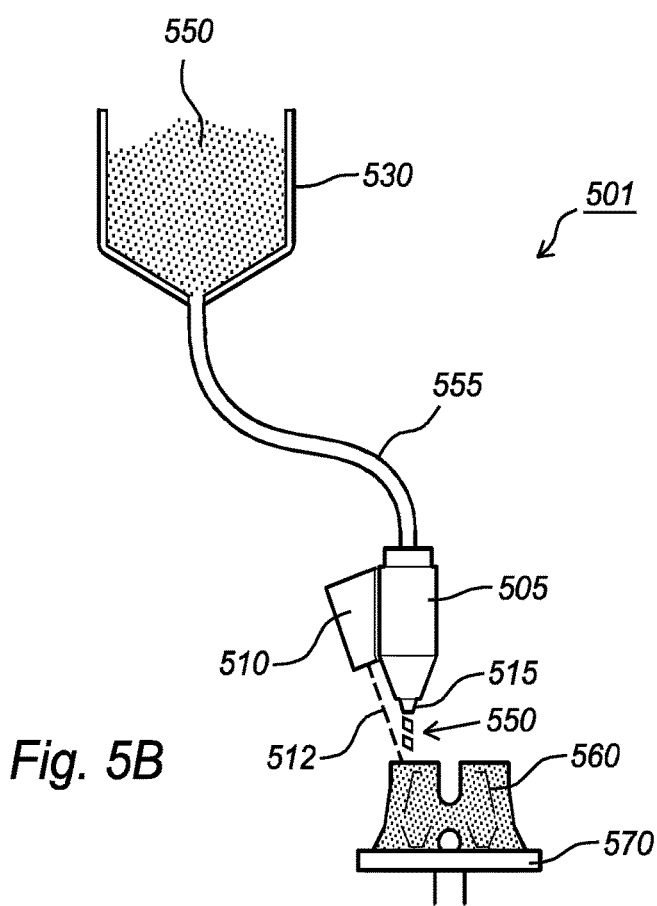
FIG. 5B shows a fourth embodiment of the additive manufacturing tool in which the granulated solid material is dispensed from a dispenser for applying the printed material in the additive manufacturing process.

FIG. 5B shows a fourth embodiment of the additive manufacturing tool 501 or SLS tool 501 in which the granulated solid material 550 is dispensed from a dispenser 505 or print head 505 for applying the printed material 560 in the additive manufacturing process. The additive manufacturing tool 501 again comprises the granulate container 530 comprising the granulated solid particles 550 which are fed via a feed 555 towards the print head 505. The print head 505 further comprises a print nozzle 515 from which granulated solid particles 550 are emitted towards the printed material 560. These solid particles 550 may fall under gravity from the print head 505 to the printed material 560 or may be ejected from the print nozzle 515 using some ejection mechanism (not shown) towards the printed material 560. The print head 505 further comprises a laser 510 emitting a laser beam 512 for immediately melting or sintering the solid particle 550 when it hits the printed material 560 to fix the solid particle 550 to the already printed material 560. The printed material 560 forming a solid object may be located on a platform 570.

Figure 6:
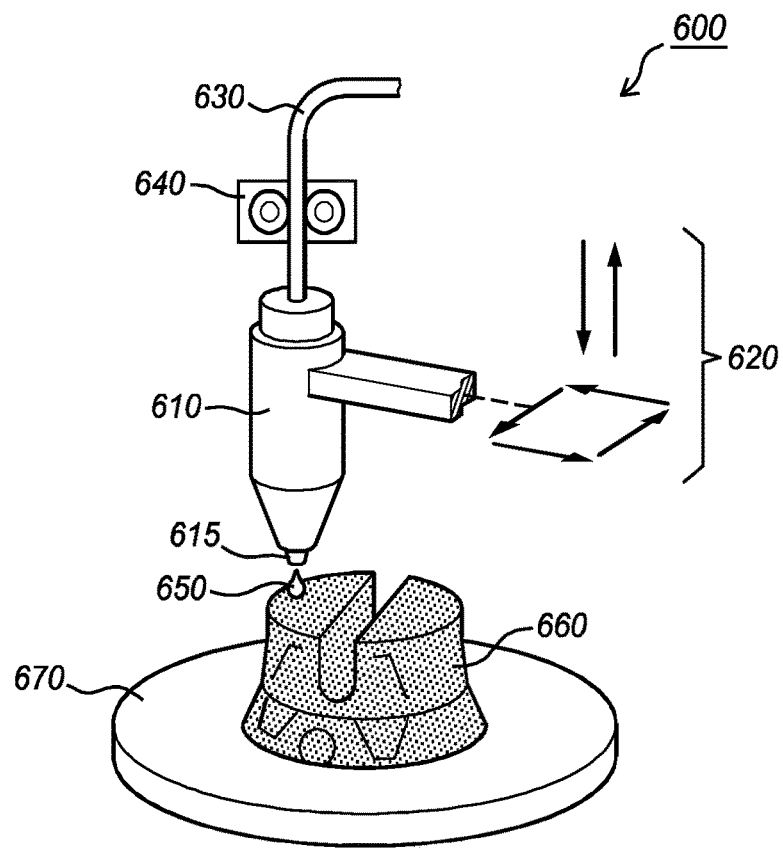
FIG. 6 shows a fifth embodiment of the additive manufacturing tool in which a melted plastic material is dispensed for applying the printed material in the additive manufacturing process, and It should be noted that items which have the same reference numbers in different Figures, have the same structural features and the same functions, or are the same signals. Where the function and/or structure of such an item has been explained, there is no necessity for repeated explanation thereof in the detailed description.

FIG. 6 shows a fifth embodiment of the additive manufacturing tool 600 in which a melted plastic material 650 is dispensed for applying the printed material 660 in the additive manufacturing process. The additive manufacturing tool 600 shown in FIG. 6 is also known as Fused Deposition Modeling tool 600 or FDM tool 600. Now a plastic filament 630 is fed into a dispenser 610 or melter 610 via a filament feeder 640. The dispenser 610 or melter 610 comprises an extrusion nozzle 615 for melting the plastic filament 630 to form a droplet of melted plastic material 650 which is applied to the printed material 660 where it hardens and connects to the already printed material 660. The dispenser 610 may be configured and constructed to apply the droplet of melted plastic 650 to the printed material 660 under gravity or via an ejection mechanism (not shown). The additive manufacturing tool 600 further comprises a positioning system 620 for positioning the dispenser 610 across the printed material 660.

Summarizing, the invention provides a ring 380, 390 for a bearing 300. The invention further provides an inner ring 380, an outer ring 390 and the bearing. The ring comprises a raceway ring 310, 320 being a hardened steel metal ring 310, 320 comprising a raceway surface configured and constructed for guiding rolling elements 305 of the bearing. The ring further comprises printed material 350, 360 bonded to the steel of the raceway ring. The printed material being material printed via an additive manufacturing process. The printed material may be used to customize a shape of the ring, for example, of the inner ring or the outer ring of the bearing, thus allowing flexible customization.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

| LISTING OF REFERENCE NUMBERS | | | |
|---|---|---|---|
| Ring | 100, 280, 380, 290, 390 | Cavity | 367 |
| | | Construction hole | 365 |
| Rotational axis | A | Additive manufacturing tool | 400, 401 |
| Raceway ring | 110, 210, 212, 220, 310, 320 | Print head | 405, 505 |
| Bearing | 200, 300 | Print nozzle | 415, 515 |
| Rolling elements | 205, 305 | Laser | 410, 510 |
| Raceway surface | 130, 230, 330 | Laser beam | 412, 512 |
| Opposite surface | 240, 340 | Scanning mirror | 420, 520 |
| Attachment element | 245, 345 | Resin container | 430 |
| Indentations | 245 | Re-coating bar | 440 |
| Circumferential Groove | 247 | Liquid resin | 450 |
| Coating | 248 | Feed | 455, 555 |
| Structural material | 250, 260, 350, 360 | Platform | 470, 570, 670 |
| | | SLS-tool | 500, 501 |
| Flange (Printed or turned) | 255 | Granulate container | 530 |
| Support structure | 160 | Granulate feed roller | 540 |
| Printed material | 160, 250, 255, 260 350, 360, 460, 560, 660 | Granulate material | 550 |
| | | FDM-tool | 600 |
| | | Melter | 610 |
| Printable material | 450, 550, 650 | Extrusion nozzle | 615 |
| Inner ring | 280, 380 | Positioning construction | 620 |
| Outer ring | 290, 390 | Filament | 630 |
| Contact area | 335 | Filament feeder | 640 |
| Non-stressed area | 337 | Liquid plastic | 650 |
| Opposite area | 370 | | |
| Edge | 375 | | |

The invention claimed is:

1. A bearing, comprising:
a first raceway ring and a second raceway ring, the first raceway ring having a raceway surface configured to contact a rolling element and having a rear surface located opposite to the raceway surface, the raceway surface and the rear surface being connected via a first radially extending axial surface and a second radially extending axial surface, the first raceway ring defining a plurality of indentations each overlapping an edge between the rear surface and one of the first and second radially extending axial surfaces;
a first material printed using an additive process over the first raceway ring to form a first ring, the first material also being disposed within the plurality of indentations and increasing attachment between the first material and the first raceway ring, wherein the first material is printed so as to form a plurality of cavities in the first ring that are spaced from the first raceway ring;

a second material printed using an additive process over the second raceway ring to form a second ring such that the second raceway ring is configured to contact the rolling element; and the rolling element positioned between the first ring and the second ring and contacting the first raceway ring and the second raceway ring, wherein the first raceway ring further comprises an attachment element formed by at least one of: (1) a circumferential groove in circumferential direction, and (2) a coating applied to at least a part of the raceway ring.

2. The bearing of claim 1, wherein the attachment element is the circumferential groove, the first material being printed in the circumferential groove and forming a bond between the first material and the first raceway ring.

3. The bearing of claim 2, wherein a contact area is an area where the rolling element contacts the first raceway surface, and wherein the circumferential groove is only present outside of the contact area.

4. The bearing of claim 2, wherein the first material is printed on and bonded to the first raceway ring only outside the contact area.

5. The bearing of claim 1, wherein the raceway surface has a non-stressed area in circumferential direction between a contact area and an edge of the first raceway ring, the raceway surface having the attachment element only in the non-stressed area.

6. The bearing of claim 1, wherein the first ring has a flange constructed and configured for at least partially supporting the rolling element of the bearing in a direction parallel to a rotation axis of the first ring.

7. The bearing of claim 1, wherein the first material is at least one of: (1) a structural material for carrying a load for strengthening the first raceway ring, (2) a press-fit element for fitting the first ring to at least one of a shaft and to a bore, (3) a flange constructed and configured for at least partially supporting the rolling element of the bearing in a direction parallel to a rotational axis (A) of the first ring, (4) a support structure for supporting the first ring, or (5) a non-circular construction.

8. The bearing of claim 1, wherein a dimension of the raceway ring in a direction perpendicular to a rotational axis (A) of the first ring is more than 15% of a width of the contact area.

9. The bearing of claim 1, wherein the first material is a metal having a granular structure.

10. The bearing of claim 1, wherein the first material is chosen from a list comprising steel, stainless steel, maraging steel, tool steel, low alloy steel, copper alloys, nickel alloys, cobalt alloys, aluminum, aluminum alloys, titanium, titanium alloys.

11. The bearing of claim 1, wherein the first raceway ring is an inner ring of the bearing, the raceway surface facing away from the rotational axis (A).

12. The bearing of claim 1, wherein the first raceway ring is an outer ring of the bearing, the raceway surface facing towards the rotational axis (A).

* * * * *